United States Patent
Gao et al.

(10) Patent No.: US 10,321,511 B2
(45) Date of Patent: *Jun. 11, 2019

(54) SYSTEMS AND METHODS FOR DATA OFFLOAD IN WIRELESS NETWORKS

(71) Applicant: BlackBerry Limited, Waterloo (CA)

(72) Inventors: Shiwei Gao, Nepean (CA); Yufei Wu Blankenship, Kildeer, IL (US); Zhijun Cai, Ashburn, VA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/967,228

(22) Filed: Apr. 30, 2018

(65) Prior Publication Data

US 2018/0249529 A1 Aug. 30, 2018

Related U.S. Application Data

(63) Continuation of application No. 15/331,152, filed on Oct. 21, 2016, now Pat. No. 9,961,715, which is a (Continued)

(51) Int. Cl.
*H04L 12/28* (2006.01)
*H04W 76/27* (2018.01)
(Continued)

(52) U.S. Cl.
CPC .............. *H04W 76/27* (2018.02); *H04B 7/02* (2013.01); *H04L 63/0428* (2013.01);
(Continued)

(58) Field of Classification Search
USPC ....................................... 370/252, 230, 278
See application file for complete search history.

(56) References Cited

U.S. PATENT DOCUMENTS

2008/0285499 A1 11/2008 Zhang et al.
2009/0163211 A1 6/2009 Kitazoe et al.
(Continued)

FOREIGN PATENT DOCUMENTS

WO 2013027024 2/2013
WO 2013029000 2/2013
WO 2013070127 5/2013

OTHER PUBLICATIONS

3GPP TS 36.300; "Evolution Universal Terrestrial Radio Access (E-UTRA); overall description, stage 2 (Release 11 )", v11.5.0, Mar. 2013.

(Continued)

*Primary Examiner* — John Pezzlo
(74) *Attorney, Agent, or Firm* — Fish & Richardson P.C.

(57) ABSTRACT

Systems, methods, and apparatuses for radio resource control (RRC) signaling in wireless communication networks with data offload are provided. The radio configuration messages from a small cell to a dual connection UE may be sent by an overlay macro E-UTRAN node-B (eNB). The small cell may send the RRC messages to the macro-eNB first via a backhaul link, and the macro-eNB then transmits the messages to the UE. In some implementations, the radio configuration messages from a small cell to a dual connection UE may be sent directly from the small cell. In some other implementations, some of the RRC messages may be sent selectively to/from either the macro-cell or the small cell, or to/from both the macro-cell and the small cell. The type of RRC messages sent over the small cell and/or the macro-cell may be preconfigured or predetermined.

20 Claims, 13 Drawing Sheets

Related U.S. Application Data continuation of application No. 13/907,367, filed on May 31, 2013, now Pat. No. 9,479,230.

(51) Int. Cl.
| | | |
|---|---|---|
| *H04W 76/15* | (2018.01) | |
| *H04B 7/02* | (2018.01) | |
| *H04W 16/32* | (2009.01) | |
| *H04W 72/04* | (2009.01) | |
| *H04L 29/06* | (2006.01) | |
| *H04J 1/16* | (2006.01) | |
| *H04W 92/20* | (2009.01) | |
| *H04W 88/06* | (2009.01) | |

(52) U.S. Cl.
CPC ....... *H04W 16/32* (2013.01); *H04W 72/0426* (2013.01); *H04W 76/15* (2018.02); *H04W 72/0473* (2013.01); *H04W 88/06* (2013.01); *H04W 92/20* (2013.01)

(56) References Cited

U.S. PATENT DOCUMENTS

| | | |
|---|---|---|
| 2012/0106432 A1 | 5/2012 | Lee et al. |
| 2012/0129565 A1 | 5/2012 | Frost |
| 2012/0213092 A1 | 8/2012 | Sun et al. |
| 2013/0016841 A1* | 1/2013 | Fong ............... H04L 5/001 380/287 |
| 2013/0039232 A1 | 2/2013 | Kim et al. |
| 2013/0088983 A1* | 4/2013 | Pragada ............... H04W 16/14 370/252 |
| 2013/0107704 A1 | 5/2013 | Dinan |
| 2013/0128790 A1 | 5/2013 | Futaki et al. |
| 2013/0223271 A1 | 8/2013 | Huang |
| 2013/0250881 A1 | 9/2013 | Liao |
| 2013/0301571 A1 | 11/2013 | Sorrentino |
| 2014/0098789 A1 | 4/2014 | Liu |
| 2014/0126497 A1 | 5/2014 | Xu |
| 2014/0204771 A1 | 7/2014 | Gao et al. |
| 2014/0247781 A1 | 9/2014 | Somasundaram |
| 2014/0348146 A1 | 11/2014 | Malkamaki |
| 2014/0355562 A1 | 12/2014 | Gao et al. |
| 2016/0080997 A1 | 3/2016 | Hu |

OTHER PUBLICATIONS

3GPP TS 36.331; "Evolution Universal Terrestrial Radio Access (E-UTRA); Radio Resource Control (RRC), Protocol specification (Release 11 )", v11.0.0, Jun. 2012.

International Search Report and Written Opinion in International Application No. PCT/US2014/040255, dated Oct. 10, 2014, 8 pages.

Extended European Search Report issued in European Application No. 14804195.7 dated May 18, 2016.

Office Action issued in U.S. Appl. No. 15/331,152 dated Aug. 2, 2017, 9 pages.

Notice of Allowance issued in U.S. Appl. No. 15/331,152 dated Dec. 28, 2017, 10 pages.

Ex Parte Quayle issued in U.S. Appl. No. 15/331,152 dated Nov. 20, 2017, 5 pages.

* cited by examiner

SYSTEMS AND METHODS FOR DATA OFFLOAD IN WIRELESS NETWORKS

This patent is a continuation of and claims the benefit of U.S. Non-Provisional application Ser. No. 15/331,152, filed Oct. 21, 2016, which is a continuation of and claims the benefit of U.S. Non-Provisional application Ser. No. 13/907,367, filed May 31, 2013, the entire contents of which is hereby expressly incorporated by reference herein in their entireties.

TECHNICAL FIELD

The present disclosure generally relates to wireless networks, and more particularly, to systems and methods for data offload in wireless networks.

BACKGROUND

In cellular wireless networks such as UMTS Terrestrial Radio Access Network (UTRAN) and an Evolved Universal Terrestrial Radio Access Network (E-UTRAN), cells capable of covering different size areas are deployed to improve cell coverage or to offload traffic. In a UTRAN or E-UTRAN network, small cells capable of covering small areas (e.g., pico cells, relay cells, or femto cells) are deployed with overlay large cells capable of covering larger areas (also known as macro-cells). A network including large cells and small cells is referred to as a heterogeneous wireless communication network or, for simplicity, as a heterogeneous network.

Macro-cells and small cells may operate in the same carrier frequency or different carrier frequencies. Operating the macro-cells and small cells on the same frequency generates cell splitting gain, and as a result, increases system capacity. On the other hand, operating the macro-cells and small cells on different carrier frequencies helps to reduce the interference among cells. A user equipment (UE) such as a mobile phone or other device in communication with a network and moving in an area with a large number of small cells may experience frequent handovers due to the smaller coverage area of a small cell.

BRIEF DESCRIPTION OF THE DRAWINGS

The accompanying drawings, which are incorporated in and constitute part of this specification, and together with the description, illustrate and serve to explain various embodiments.

DETAILED DESCRIPTION

Figure 1:
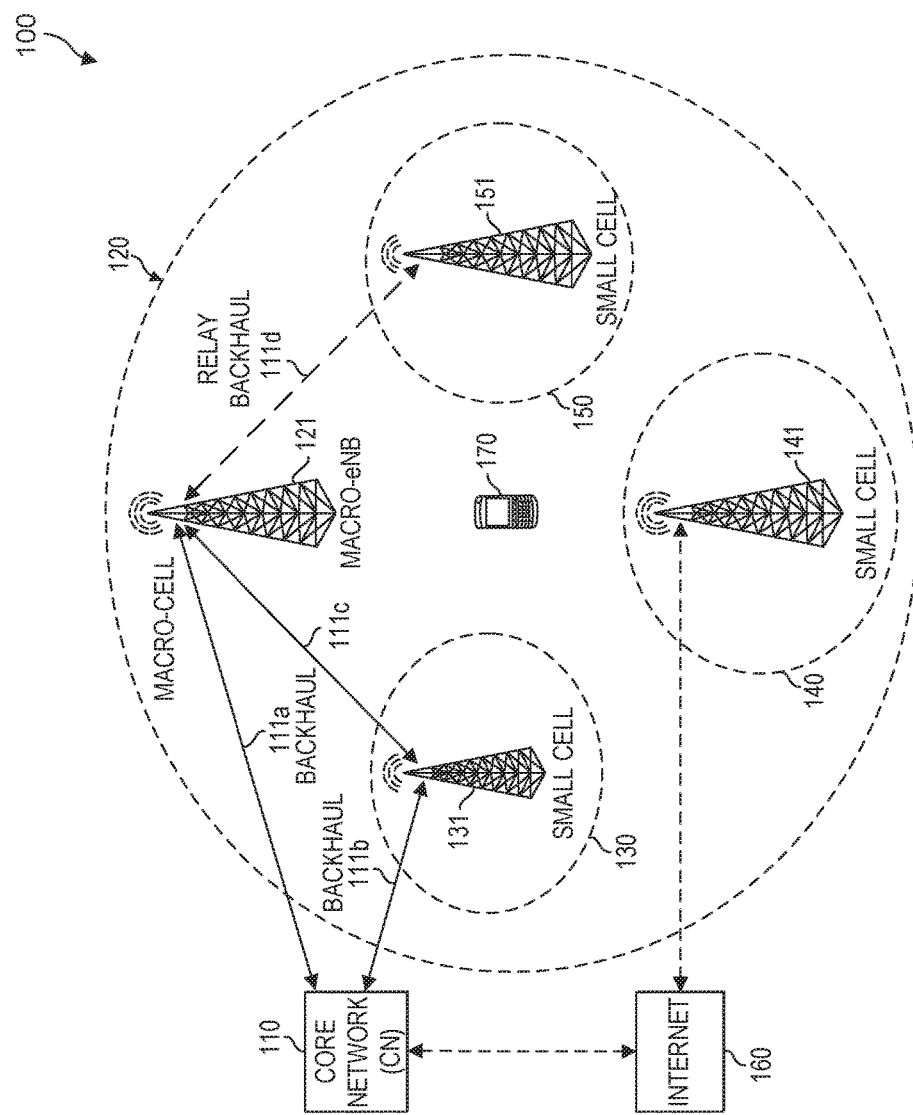
FIG. 1 illustrates an example E-UTRAN wireless communication network for implementing methods and systems consistent with the present disclosure.

The present disclosure relates to systems, methods, and apparatuses for communication offload and the associated radio resource control signaling in wireless communication networks. A user equipment (UE) may be capable of supporting dual or multiple connections with multiple cells. "Dual connection", "dual connectivity", or "concurrent connections", refers to an operation where a given UE consumes radio resources provided by at least two different network nodes connected with backhaul link while the UE is in a connected state, for example, in a RRC_CONNECTED state. While the present application uses two wireless connection for brevity, dual-connectivity may include more than two wireless connections. The backhaul link can be ideal or non-ideal. In this application the two different network points are referred to as macro-eNB and small cell eNB respectively, with their cells referred to as macro-cell and small cell, respectively. Other terminologies may be used to refer to the pair of macro-eNB and small cell eNB, such as "master eNB" and "secondary eNB", "anchor eNB" and "assisting eNB", etc. Correspondingly, other terminologies may be used to refer to the pair of macro-cell and small cell, such as "master cell" and "secondary cell", "anchor cell" and "assisting cell", etc. While the pairing of a macro-cell and a small cell is used in the present application, the methodologies can be extended to other cell type combinations, such as between two neighbor small cells where one is elected as the anchor cell for a given UE. The dual connection (or concurrent connections) between the UE and the network nodes can be physical or logical. The dual connection (or concurrent connections) is physical where the UE is able to communicate over at least two wireless links (one between UE and macro-eNB, the other between UE and small cell eNB) simultaneously. The dual connection (or concurrent connections) can also be logical where the at least two connections are simultaneously maintained at higher layers (i.e., above physical layer), but physical communication is toggled among the at least two wireless links (i.e., not simultaneous).

A macro-cell may offload some of the user plane traffic to a small cell if the UE, which is capable of supporting dual or multiple connections, is under the coverage of the small cell. To enable offload from a macro-cell to a small cell for a UE, it may be desirable for the UE to be informed about the radio resource configurations of the small cell. The radio resource configurations may include UE specific configurations, such as downlink (DL) and uplink (UL) radio channels and reference signals. For example, the configuration may cover UL physical uplink control channel (PUCCH), sounding reference signal (SRS), and scheduling request (SR) resource allocations. The radio resource configurations may also include common radio resource configurations in the small cell such as physical random access channel (PRACH) configuration, multi-media broadcast single frequency network (MBSFN) subframes, etc. The radio resource configurations may be signaled using radio resource control (RRC) messages in an E-UTRAN wireless network. In addition, both the common and UE specific configurations in a small cell may change from time to time, and it may be desirable to propagate information on this to the UE. RRC signaling also enable establishment, configuration, maintenance and release of Data Radio Bearers (DRBs) offloaded to the small cell, as well as quality of service (QoS) management functions for those DRBs.

To perform RRC signaling for the small cell, in some implementations, radio configuration messages may be sent from a small cell to a dual connection UE by an overlay macro E-UTRAN node-B (eNB). The small cell may send the RRC messages to the macro-eNB first via a backhaul link connecting the two nodes, and the macro-eNB then transmits the messages to the UE over its signaling radio bearers (SRBs). In some implementations, the radio configuration messages may be sent from a small cell to a dual connection UE directly from the small cell. One benefit of this implementation is that backhaul delay and overhead associated with sending the RRC messages from the small eNB to the macro-eNB can be avoided. In some other implementations, some of the RRC messages may be sent selectively to/from either the macro-cell or the small cell, or to/from both the macro-cell and the small cell. The type of RRC messages sent over the small cell and/or the macro-cell may be preconfigured or predetermined.

Reference will now be made in detail to the example embodiments implemented according to the disclosure; the examples are illustrated in the accompanying drawings. Wherever possible, the same reference numbers will be used throughout the drawings to refer to the same or like parts.

FIG. 1 illustrates an example E-UTRAN wireless communication network 100 in which systems and methods consistent with this disclosure may be implemented. The illustrated wireless communication network 100 includes a core network 110 and a macro-cell or overlay cell 120. The term "cell" or "wireless cell" generally refers to an area of coverage of wireless transmission by a network or network component, such as an access node. The core network 110 is, in some implementations, connected to a data network such as Internet 160.

In the illustrated implementation, macro-cell 120 includes at least one base station. The term "base station" (BS) can be interchangeably used with a network node, an access node, or a network component. Two or more base stations may operate on the same radio frequency or on different radio frequencies. The base station is, in some implementations, an overlay access node 121, which is connected to the core network 110 via a backhaul link 111a, including optical fiber or cable. The backhaul link between the macro-eNB and the core network is referred to as an S1 interface. The term "overlay access node" generally refers to a network element or component that at least partly serves to form a wireless cell. In one implementation in which the network 100 is a long term evolution (LTE) network, the overlay access node 121 can be a Universal Terrestrial Radio Access Network (UTRAN) node B or "eNB" which is part of an evolved Universal Terrestrial Radio Access Network (E-UTRAN). An eNB that forms an overlay access node of a macro-cell can be generally referred to as a "macro node" or a "macro-eNB." The term "eNB" may be interchangeably used with an "evolved node B." The eNBs may cooperate to conduct a mobility procedure for User Equipment (UE) in the network 100.

The network 100 also includes, in some implementations, one or more underlay small cells. The small cell described in the present disclosure comprises a cell that facilitates communication with the UE as the UE communicates with a macro-cell simultaneously. Specifically, in dual connectivity, "Master eNB" refers to the eNB which maintains the UE's RRC context and terminates at least S1-MME acting as mobility anchor towards the core network (CN). Small cells are "Secondary eNB" in dual connectivity, which is an eNB (not the Master eNB) providing additional radio resources for the UE. For example, pico cells and femto cells are configurable as small cells. The underlay small cells are served by low power nodes, where the low power nodes can be for example, a pico cell, a femto cell, a relay cell, or other types of small cell nodes. In some implementations, the underlay cells have a coverage at least partially overlapping with the coverage of the macro-cell 120. While the term "underlay cell" is described herein in the context of LTE, the implementations described herein can be adapted for other wireless standards that have components similar to underlay cells, such as cellular telecommunication systems such as Global System for Mobile Communication (GSM) protocols, Universal Mobile Telecommunications System (UMTS), IEEE 802.11 Wireless Local Area Network (WLAN), and IEEE 802.16 WiMAX, which may also include small cells such as pico/femto cells. The underlay cells may also be referred to as the small cells in the present application.

Although FIG. 1 illustrates one macro-cell and three small cells, the network 100 can include more or less of such cell types. Further the small cells may be sparsely or densely deployed. The underlay cells 130, 140 have a smaller coverage than the overlay cell 120. For example, in a suburban environment, the overlay cell 120 may have a coverage radius of approximately 0.5 kilometer, while the underlay cells 130, 140 may have a coverage radius of approximately 0.2 kilometer.

Access nodes 131, 141 forming the underlay cells 130, 140 use a lower transmission power than that of the overlay access node 121. The underlay cells 130, 140 may further include a range expansion area used for increasing the coverage area for the cells having a smaller coverage. The access nodes forming the underlay cells may also be referred as low power nodes or low power eNBs.

The small cell 130, for example, may be an enhanced pico cell that includes a pico eNB 131 connected to a core network (CN) 110 via a backhaul link 111b and to a macro node, such as the macro-eNB 121, via a backhaul link 111c. The backhaul link between the macro-eNB and the pico eNB is referred to as an X2 interface. The backhaul links 111b and 111c include, for example, cable, fiber, and wireless links. In some implementations, the pico eNB 131 can have a transmission power that is, for example, about 30 dBm, which is about 13 to 16 dB lower than the transmission power of the macro-eNB 121, which may be about 43 to 46 dBm.

The small cell 140, for example, may be an enhanced femto cell that includes a femto eNB 141 connected to the core network 110 via the Internet 160 via a wired or wireless connection. The femto cell 140 is a subscription based cell and can be referred to as a closed subscription group (CSG) cell. The term "closed subscription group (CSG)" can be interchangeably used with closed subscriber group. The term "femto eNB" can also be referred to as a "home eNB (HeNB)." In such instances, the macro-eNB 121 can be referred to as a source eNB. In some implementations, the femto eNB 141 can have a transmission power that is, for example, about 20 dBm, which is about 23 to 26 dB lower than that of the macro-eNB 121.

The network 100 also includes, in some implementations, a relay node 151 that, for example, serves to wirelessly relay data and/or control information between the macro-eNB 121 and user equipment 170. The macro-eNB 121 and the relay node 151 are connected to each other via a wireless backhaul link 111d. In such an instance, the macro-eNB 121 is referred to as a "donor eNB." In some implementations, the relay node 151 has a transmission power that is, for example, about 30 or 37 dBm, which is about 13 dB or 6 dB lower than that of the macro-eNB 121. The term "underlay access node" may sometimes be used in this disclosure to refer to a variety of small cell eNBs, which are low power nodes that serves the UEs jointly with overlay access nodes. Example variations of small cells include pico eNBs, femto eNBs, relay nodes, or SeNBs dedicated to data offloading.

The CN 110 in this embodiment is a backbone network, which may be considered a central part of the telecommunications system. In certain implementations, evolved packet core (EPC) serves as a main component of the CN 110. The CN 110 can include a mobility management entity (MME), a serving gateway (SGW), and a packet data network gateway (PGW). The MME is a main control element in the CN 110, and it is responsible for the functionalities comprising the control plane functions related to subscriber and session management. The SGW serves as a local mobility anchor such that the packets are routed through this point for intra EUTRAN mobility and mobility with other legacy 2G/3G systems. The SGW functions may include user plane tunnel management and switching. The PGW provides connectivity to a services domain comprising external networks, such as IP networks.

The UE 170 communicates wirelessly with the overlay access node 121 or the underlay access nodes 131, 141, 151, depending on the location or the existence of subscription in the case of the femto cell 140. The term "user equipment," alternatively "UE," refers to various devices with telecommunications capabilities, such as mobile devices and network appliances. The UE may maintain connections with both an overlay access node and an underlay access node and communicate with them simultaneously. For example, the overlay access node may serve the control plane traffic for the UE, and the underlay access node may serve the data plane traffic for the UE.

Examples of user equipment (UE) include, but are not limited to, a mobile phone, a smart phone, a telephone, a television, a remote controller, a set-top box, a computer monitor, a computer (including a tablet computer such as BlackBerry® Playbook tablet, a desktop computer, a hand-held or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, a game device, etc. The UE 170 includes a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 170 includes the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

Figure 2:
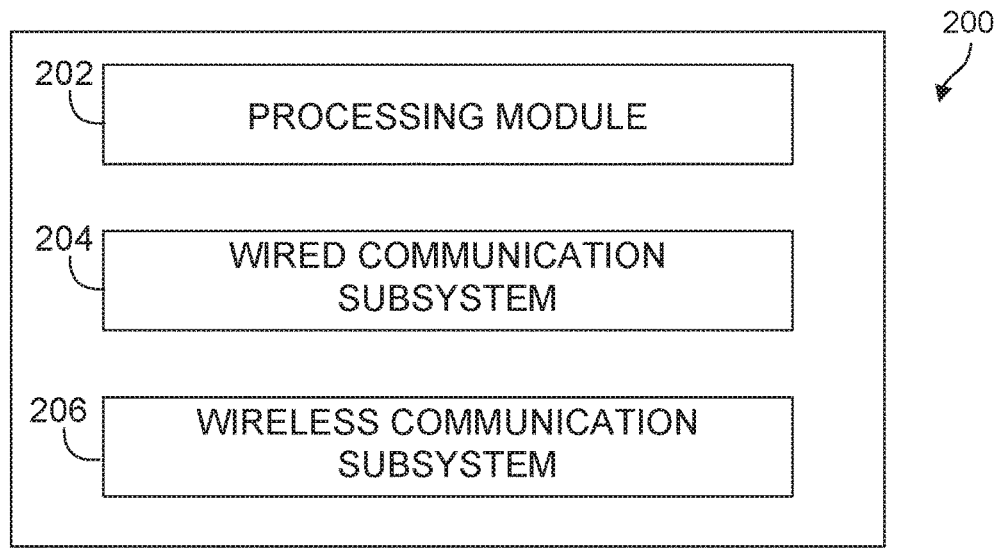
FIG. 2 illustrates an example access node device, in accordance with an embodiment of the present disclosure.

FIG. 2 illustrates components of an example access node device 200 consistent with certain aspects of this disclosure. The example access node device 200 includes a processing module 202, a wired communication subsystem 204, and a wireless communication subsystem 206. The processing module 202 includes one or more processing components (alternatively referred to as "processors" or "central processing units" (CPUs)) operable to execute instructions related to one or more of the processes, steps, or actions described in connection with one or more of the embodiments disclosed herein. The processing module 202 also includes other auxiliary components, such as random access memory (RAM), read only memory (ROM), secondary storage (for example, a hard disk drive or flash memory). Additionally, the processing module 202 executes certain instructions and commands to provide wireless or wired communication, using the wired communication subsystem 204 or a wireless communication subsystem 206. One skilled in the art will readily appreciate that various other components can also be included in the example access node device 200.

Figure 3:
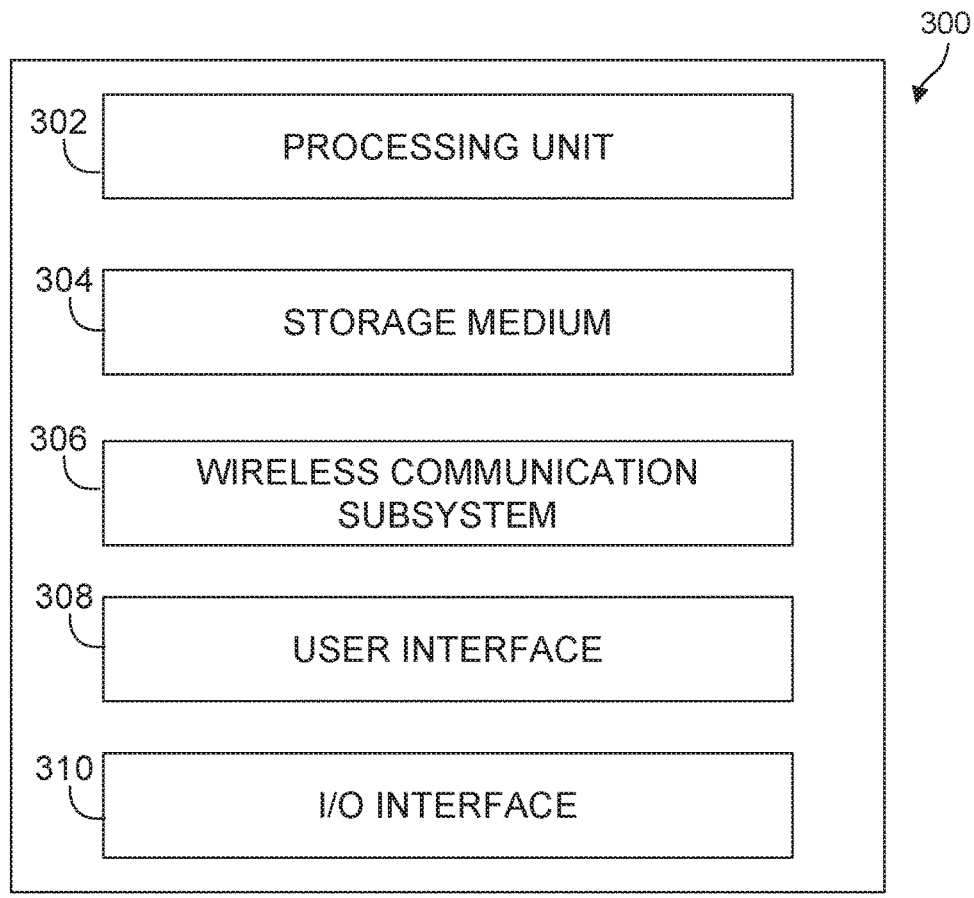
FIG. 3 illustrates an example user equipment device, in accordance with an embodiment of the present disclosure.

FIG. 3 illustrates components of an example user equipment device 300 consistent with certain aspects of the present disclosure. The example user equipment device 300 includes a processing unit 302, a computer readable storage medium 304 (for example, ROM or flash memory), a wireless communication subsystem 306, a user interface 308, and an I/O interface 310.

The processing unit 302 includes components and performs functions similar to the processing module 302 described with regard to FIG. 2. The wireless communication subsystem 306 is configured to provide wireless communications for data information or control information provided by the processing unit 302. The wireless communication subsystem 306 includes, for example, one or more antennas, a receiver, a transmitter, a local oscillator, a mixer, and a digital signal processing (DSP) unit. In some implementations, the wireless communication subsystem 306 can support MIMO transmissions.

The user interface 308 includes, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone. The I/O interface 310 includes, for example, a universal serial bus (USB) interface. One skilled in the art will readily appreciate that various other components can also be included in the example UE device 300.

Figure 4:
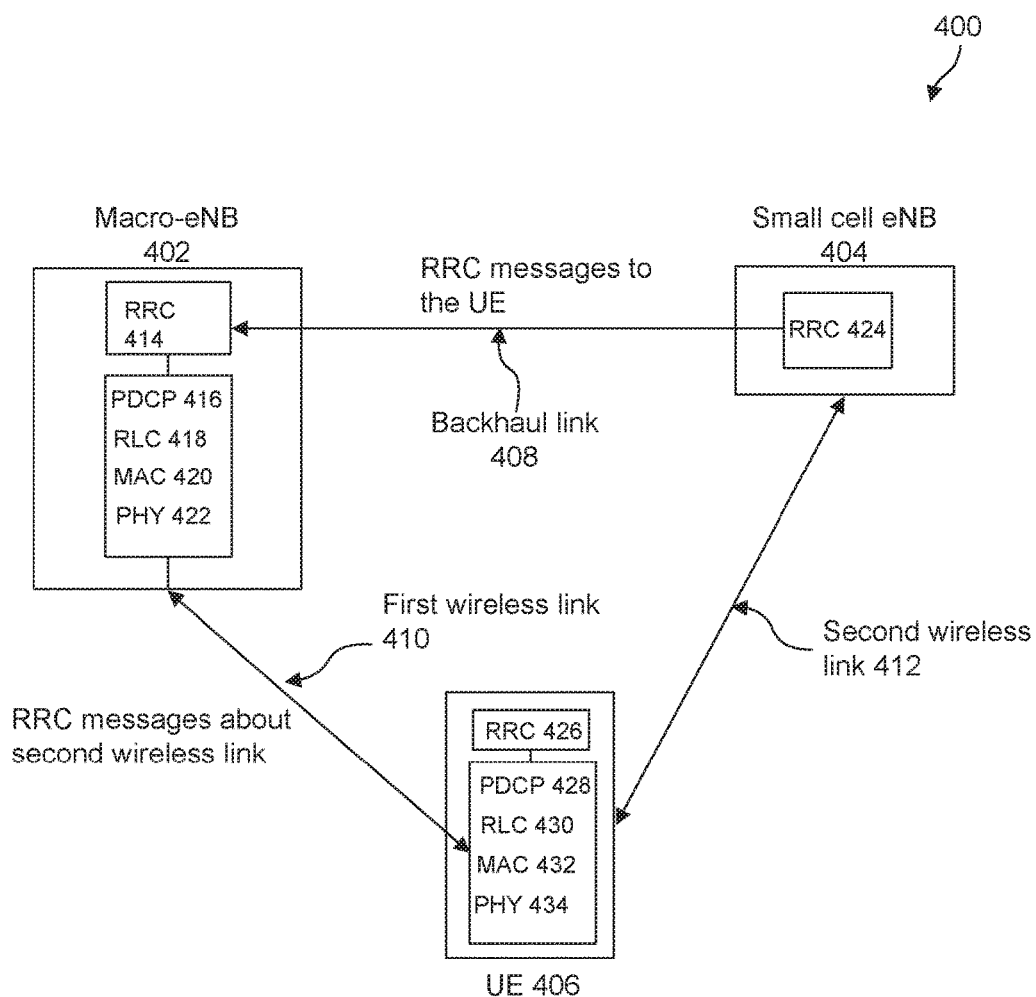
FIG. 4 illustrates a block diagram of an example method for radio resource control signaling in a wireless network with data offload, in accordance with an embodiment of the present disclosure.

FIG. 4 illustrates a block diagram 400 used to explain an example method of operating radio resource control signaling in a wireless network with data offload. In this example method, small cell related RRC messages may be relayed by macro-eNB to the UE. Small cell related RRC messages (both uplink and downlink) are communicated between the UE and the small cell eNB via the macro-eNB. For downlink messages, the RRC signaling from the small cell is relayed by the macro-eNB to the UE. For uplink messages, the RRC signal from UE is relayed by the macro-eNB to the small cell eNB. The macro-eNB 402 acts like a primary cell while the small cell eNB 404 acts like a secondary cell from a UE's perspective, in terms of control plane message delivery. In this example method, RRC messages associated with the macro-cell are delivered directly between the macro-eNB and the UE. In another example, the small cell may have independent radio resource management function which may exchange information with the macro cell's RRM function. The RRM function may handle the resource allocation, radio bearer management, admission control, etc.

As illustrated in FIG. 4, the macro-eNB 402 includes a RRC layer 414, packet data convergence protocol (PDCP) layer 416, radio link control (RLC) layer 418, medium access control (MAC) layer 420, and physical layer 422. The small cell eNB 404 includes a RRC layer 424 for UE data offloading. The UE 406 includes a RRC layer 426, PDCP layer 428, RLC layer 430, MAC layer 432, and physical layer 434.

Part or all of the UE's data traffic are offloaded from the macro-eNB 402 to the small cell eNB 404. The offloaded data is communicated to the UE 406 via the second wireless link 412 between the small cell eNB and the UE. The radio resource control and management for the UE 406 are performed independently in the small cell eNB 404 and the macro-eNB 402. An RRC entity in the small cell eNB performs radio resource configuration for the UE's data transmission and/or reception in the small cell, which is communicated to the UE via the macro-cell. That is, the radio resource configuration information for the second wireless link 412, including for example, the RRC messages addressed to the UE, is first sent from the small cell eNB to the macro-eNB over the backhaul link 408. An entity represents a particular software, or hardware, or combined software and hardware implementation, that performs certain functionalities. The macro-eNB then sends the received RRC messages from the small cell eNB, to the UE over the first wireless link 410 between the macro-eNB 402 and the UE 406. The RRC messages may be carried in the existing signaling radio bearers (SRBs) associated with the UE in the macro-cell, or carried in a SRB dedicated to the small cell connection. A signaling radio bearer is a radio bearer that is used only for the transmission of RRC and non-access stratum (NAS) messages. The corresponding RRC messages may be integrity protected and encrypted in the macro-eNB. In this example method, a single RRC entity is maintained at a UE 406 for configuring both the first wireless link 410 and the second wireless link 412. To differentiate RRC messages associated with the small cell from the RRC messages associated with the macro-cell, a label may be attached to RRC messages associated with the small cell. Examples of the label include one of {eNB ID, Global eNB ID, ECI (E-UTRAN Cell Identifier), physical cell ID} of the small cell, cluster ID the small cell belongs to, DRB ID, E-RAB ID, TEID, etc.

In some implementations, a special signaling radio bearer may be established for this purpose, for example, SRB4 or SRB5. These signaling radio bearers are dedicated used to exchange the RRC signaling for the small cells. In this approach, the RRC messages originated from different eNBs or targeted to different eNBs could be identified by the relevant SRBs. For example, the SRB 0 or SRB1 or SRB2 may be used for macro cell RRC while SRB4 or SRB5 may be used for small cell RRC.

In this example method, the RRC entity in the small cell eNB may only perform a subset of services and functions for the UE with dual or multiple connections. More specifically, the small cell eNB may not perform the following functions: paging, security functions for RRC including key management, SRB establishment, mobility functions, notification for MBMS services, NAS direct message transfer to/from NAS from/to UE.

The functionality of the RRC entity in the small cell eNB comprises configuring the wireless link between the small cell eNB and the UE. The RRC entity in the small cell eNB may perform the following services and functions for the UE data offload in the small cell: broadcast of system information related to the NAS, broadcast of system information related to the access stratum (AS), establishment, maintenance and release of an RRC connection between the UE and the small cell including for example, allocation of temporary identifiers between UE and small cell, establishment, configuration, maintenance and release of point-to-point radio bearers, QoS management functions related to the offloaded radio bearers. The RRC entity in the small cell eNB may also perform UE measurement reporting and control of the reporting. The RRC messages from the small cell may be used to signal small cell radio configurations during the initial data offload setup or for small cell radio link reconfigurations during a data offload.

In some implementations, the RRC messages from the small cell may be transparent to the macro-eNB, i.e. the macro-eNB does not read the content of the messages and simply relays them to the UE. In some implementations, the macro-eNB reads the content of the RRC messages from the small cell, and the information may be sent to the UE as part of the macro-cell RRC messages. For example, the macro-eNB may treat the small cell as a secondary cell (Scell) where the small cell configuration is equivalent to a Scell configuration.

In some implementations, the small cell eNB may transmit the RRC decisions to the macro-eNB, such as the radio bearer configurations, but not the actual RRC messages. By receiving the RRC content, the macro-eNB could compile the information into the RRC message container and deliver to the UE.

In some implementations, the UE 406 monitors may only monitor the macro-cell for any RRC messages. In addition to macro-cell specific messages, the RRC message supporting small cell radio configuration or reconfiguration are received over the first wireless link 410 between UE and macro-cell as well. The RRC messages supporting small cell radio configuration or reconfiguration may be identified as applicable to the small cell, such that the UE knows that the information is about the small cell configuration when receiving the messages. The UE may send any RRC response messages only to the macro-eNB. For RRC responses relevant to the small cell, the macro-eNB may relay the responses to the small cell eNB. The small cell eNB may not maintain a SRB for the UE.

Figure 5:
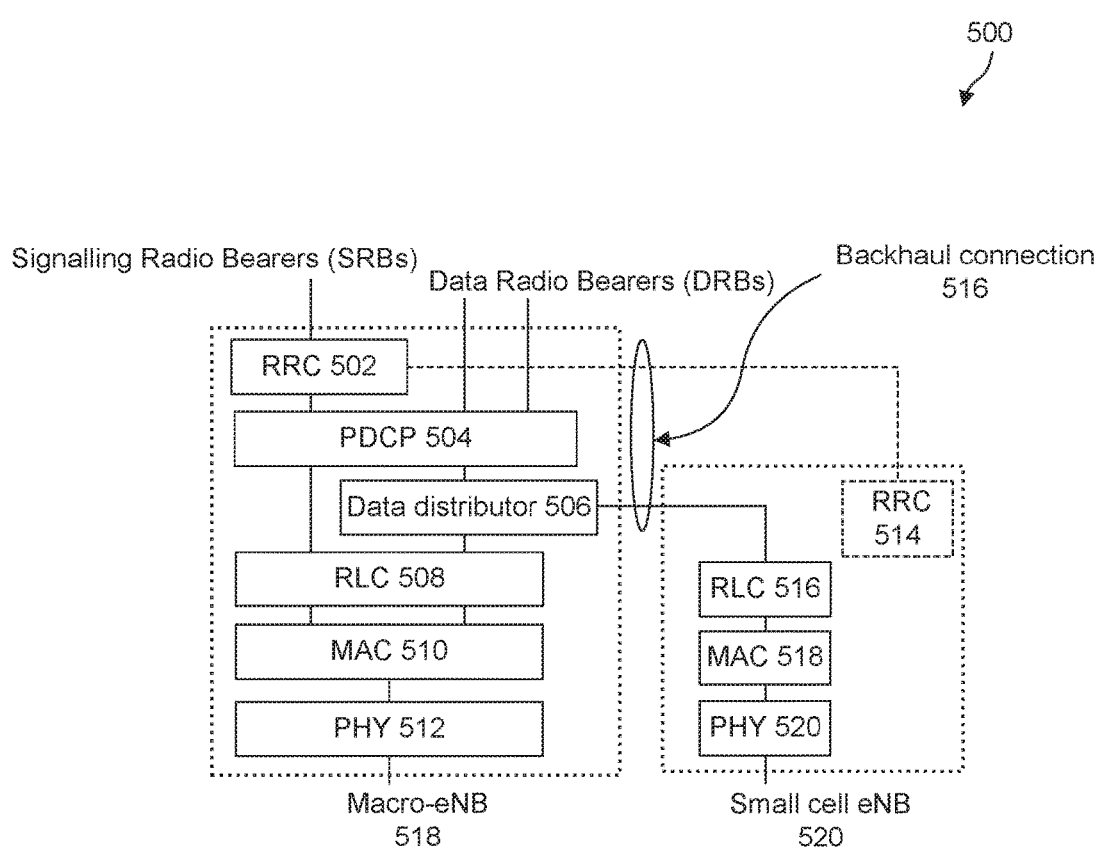
FIG. 5 illustrates an example protocol layer implementation of a macro base station and a small cell base station in a wireless network with data offload, in accordance with an embodiment of the present disclosure.

FIG. 5 illustrates an example protocol layer implementation 500 of a macro base station and a small cell base station in a wireless network with data offload, in accordance with an embodiment of the present disclosure. In this example implementation, the data offload occurs after the PDCP layer 504 in the macro-eNB 518. A single PDCP layer 504 is maintained in the macro-eNB 518, with no PDCP layer provided in the small cell eNB 520. Data going to the small cell is split after the PDCP layer 504. Note that while in FIG. 5 it is assumed that protocol stack split occurs between PDCP and RLC, other options are possible for delivering RRC messages and DRBs. For example, the split can be between RLC and MAC layers, with the data distributor 506 moved below RLC 508.

As shown in FIG. 5, the macro-eNB 518 includes a RRC layer 502, PDCP layer 504, data distributor 506, RLC layer 508, MAC layer 510, and physical layer 512. The small cell eNB 520 includes a separate RRC layer 514, RLC layer 516, MAC layer 518, and physical layer 520. The macro-eNB 518 communicates with the small cell eNB 520 via the backhaul connection 516. For example, the radio link configuration for the UE in the small cell is performed by the RRC layer 514 in the small cell eNB 520 and sent to the macro-eNB 518 via the backhaul connection. The RRC messages are then sent to the UE via the macro-eNB 518. Some of the DRBs are offloaded to the small cell eNB 520 via the backhaul connection 516, and are then transmitted to the UE by the small cell eNB 520.

The RRC 514 in the small cell eNB may perform the following functions for the UE with dual or multiple connections: sending small cell system information related to AS to the UE, (re)establishment, maintenance and release of radio connections between the UE and the small cell including allocate UE temporary identifier between UE and the small cell, (re)establishment, configuration, maintenance and release of offloaded DRBs, (re)establishment, configuration, maintenance and release of offloaded DRBs. The RRC 502 in the macro-eNB may perform the normal RRC functions in an eNB, and additionally functions for data offload, as well as relaying small cell RRC messages to the UE. It should be understood that the above described method and functionalities associated with the macro-eNB may also be applicable to another small cell eNB which may handle control plane functions for the UE.

Figure 6:
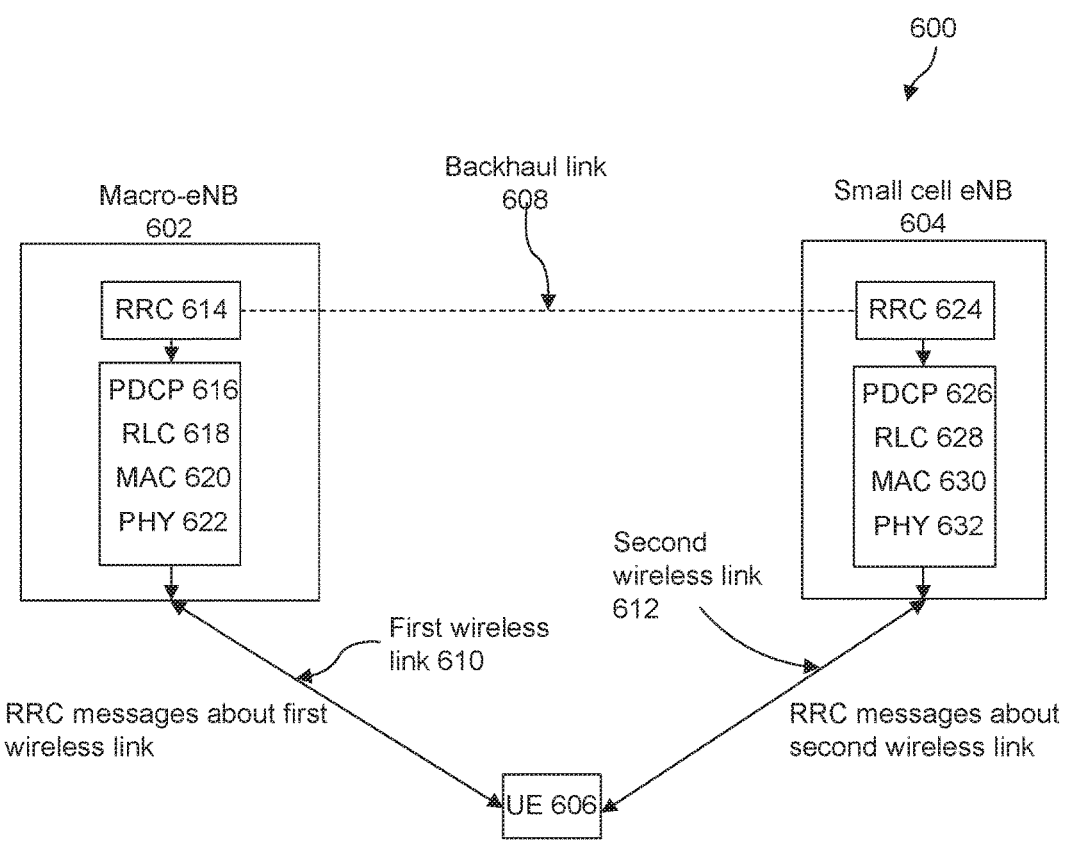
FIG. 6 illustrates a block diagram of another example method for radio resource control signaling in a wireless network with data offload, in accordance with an embodiment of the present disclosure.

FIG. 6 illustrates a block diagram 600 of another example method for radio resource control signaling in a wireless network with data offload. In this example method, small cell related RRC messages may be sent directly from the small cell to the UE. The small cell eNB exchanges the RRC messages (both uplink and downlink) with the UE without relying on the relay by the macro-eNB described above in connection with FIG. 4. The benefit of this direct communication method is that signaling overhead over the backhaul is reduced and large signaling latency associated with the backhaul may be avoided. In addition, the processing load of the macro-cell is reduced. Furthermore, by sending RRC responses to the small cell, less transmit power at the UE is needed, and thus, UE battery power could be saved. RRC messages associated with the macro-cell may be delivered directly between the macro-eNB and the UE, or relayed by the small cell eNB. In some implementations, the small cell may have an independent RRC which is used to generate and process RRC messages and operates as a peer RRC entity corresponding to the UE side RRC entity.

In some implementations, the small cell may not have an RRC entity, and the macro-cell may simply use small cell as a transmission point to deliver the RRC messages to achieve the diversity gain. For example, when the macro-cell generates an RRC message, the macro-cell may deliver the RRC message to the small cell for transmission while the macro-cell also performs the transmission. By this way, the signaling reliability could be improved.

As shown in FIG. 6, the macro-eNB 602 and small cell eNB 604 each maintains a RRC, PDCP, RLC, MAC, and physical layer protocol stack for the UE 606. The macro-eNB 602 includes a RRC layer 614, PDCP layer 616, RLC layer 618, MAC layer 620, and physical layer 622. The small cell eNB 604 includes a RRC layer 624, PDCP layer 726, RLC layer 628, MAC layer 630, and physical layer 632. The macro-eNB 602 and small cell eNB 604 may exchange RRC information over the backhaul link 608. The UE 606 receives and transmits RRC messages about the first wireless link 610 between the UE and the macro-eNB from/to the macro-eNB 602. On the other hand, the UE 606 receives and transmits RRC messages about the second wireless link 612 between the UE and the small cell eNB from/to the small cell eNB 604.

In this example method, signaling radio bearers (SRBs) need to be set up in the small cell for the UE for RRC signaling. A PDCP layer is needed in the small cell for protection (integrity and encryption) of the RRC messages and also for data encryption.

Figure 7:
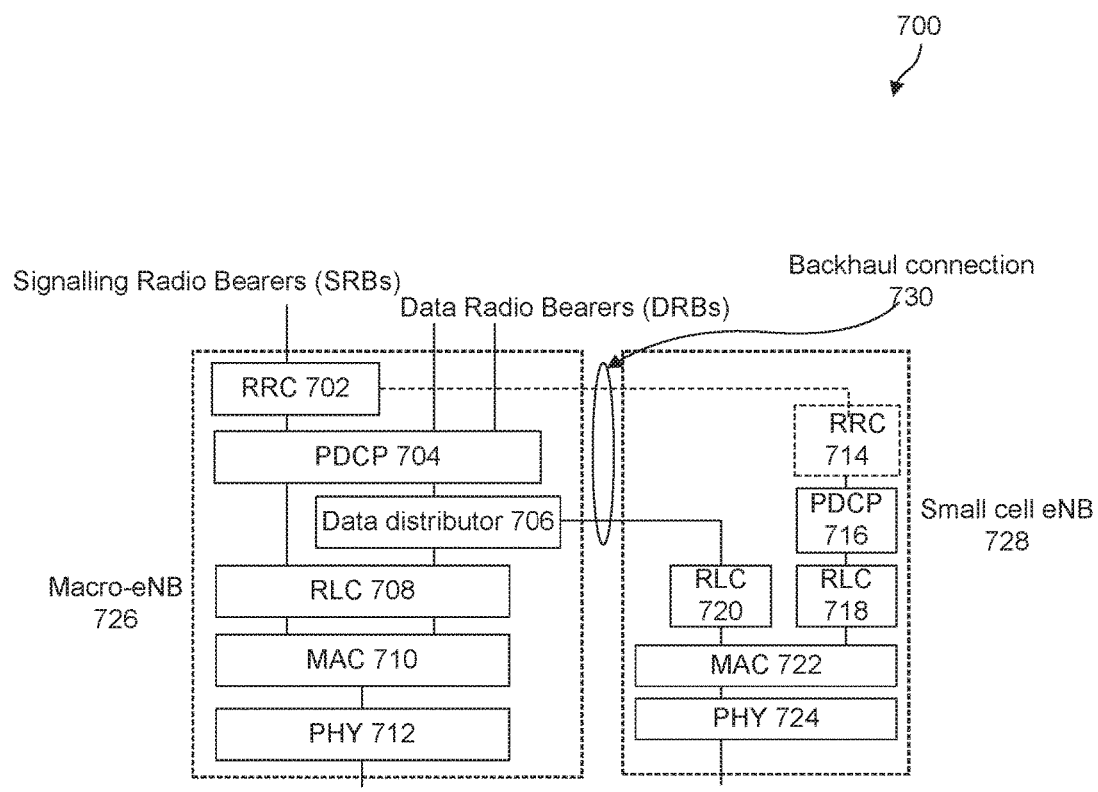
FIG. 7 illustrates another example protocol layer implementation of a macro base station and a small cell base station in a wireless network, in accordance with an embodiment of the present disclosure.

FIG. 7 illustrates an example protocol layer implementation 700 of a macro base station and a small cell base station in a wireless network, in accordance with an embodiment of the present disclosure. As illustrated in FIG. 7, the macro-eNB 726 includes a RRC layer 702, PDCP layer 704, data distributor 706, RLC layer 708, MAC layer 710, and physical layer 712. The small cell eNB 728 includes a RRC layer 714, PDCP layer 716, RLC layer 718 and 720, MAC layer 722, and physical layer 724. The macro-eNB 726 and small cell eNB 728 may exchange RRC messages and offloaded data traffic over the backhaul connection 730. A PDCP layer is maintained in the small cell eNB to support RRC signaling in the small cell. Access stratum (AS) messages associated with the small cell are transmitted over the small cell, while non-access stratum (NAS) related messages are still handled and transmitted over macro-eNB. Security keys are needed in the PDCP layer in the small cell for data encryption and integrity protection. The security key may be forwarded from the macro-eNB to the small cell eNB over the backhaul connection. Note that while in FIG. 7 it is assumed that protocol stack split occurs between PDCP and RLC, other options are possible for delivering RRC messages and DRBs. For example, the split can be between RLC and MAC layers, with the data distributor 706 moved below RLC 708.

Figure 8:
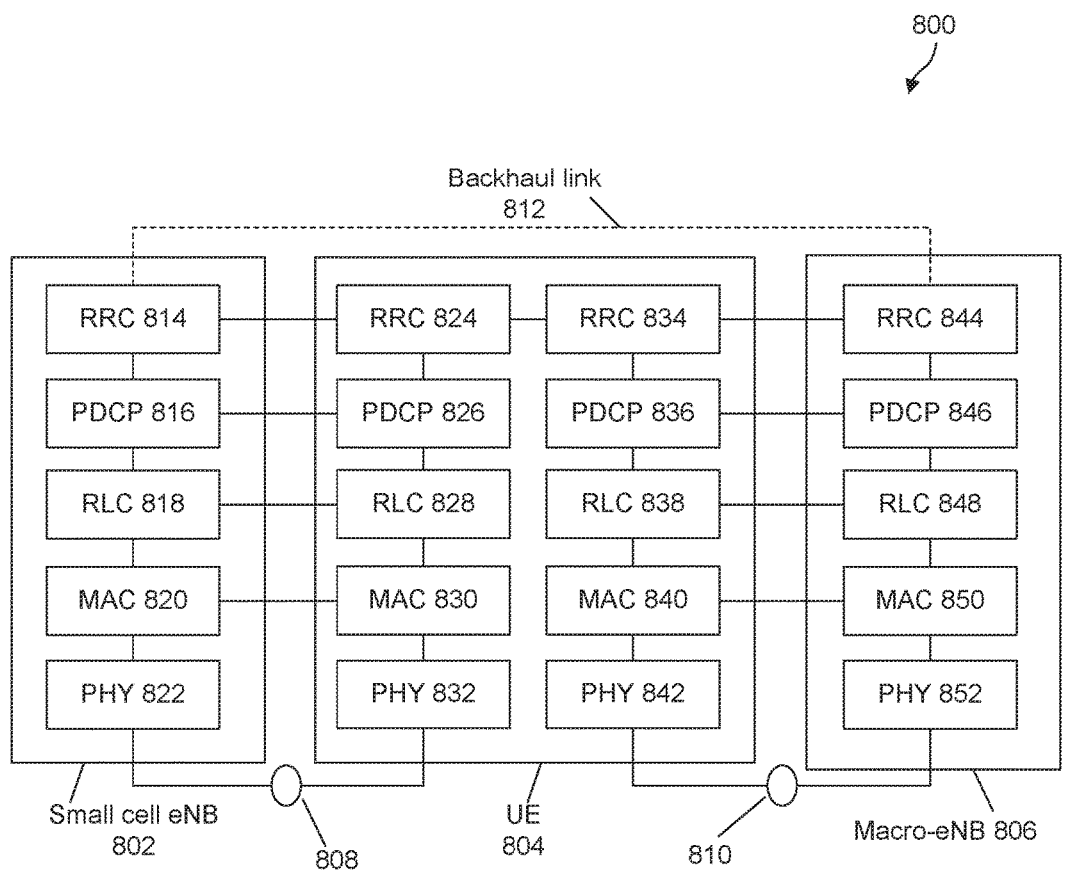
FIG. 8 illustrates an example protocol layer implementation of a UE in a wireless network with data offload, in accordance with an embodiment of the present disclosure.

FIG. 8 illustrates an example protocol layer implementation 800 of a UE in a wireless network with data offload, in accordance with an embodiment of the present disclosure. As illustrated in FIG. 8, the macro-eNB 806 includes a RRC layer 844, PDCP layer 846, RLC layer 848, MAC layer 850, and physical layer 852. The small cell eNB 802 includes a RRC layer 814, PDCP layer 816, RLC layer 818, MAC layer 820, and physical layer 822. The UE 804 maintains two separate RRC entities 824 and 834, one towards the small cell eNB 802 and the other towards the macro-eNB 806 respectively. In addition, the UE 804 maintains two separate PDCP entities 826 and 836, RLC entities 828 and 838, MAC entities 830 and 840, physical layer entities 832 and 842, one towards the small cell eNB 802 and the other towards the macro-eNB 806 respectively. The macro-eNB 806 and the small cell eNB 802 may maintain a backhaul link 812 to exchange information. The UE maintains dual connection with both the small cell eNB and the macro-eNB. As shown in FIG. 8, the UE communicates with the small cell eNB via the radio link 808, and communicates with the macro-eNB via the radio link 810. The RRC entity associated with the small cell eNB 802 performs small cell radio resource configuration. Other control plane functions including NAS messages are performed by the RRC entity in the macro-eNB 806.

In some implementations, even though the RRC messages are generated by the macro-eNB, if the RRC messages are still related with the small cell, the macro-eNB may first deliver the RRC messages to the small cell eNB, and the small cell eNB's RRC entity may transmit the RRC messages to the UE. In some implementations, the macro-eNB may make the RRC decisions, for example, mobility decision for the UEs anchored in the small cells, and then the decision may be transferred to the small cell eNB. Subsequently, the small cell eNB may generate the RRC messages according to the RRC decision received from macro-eNB, and transmit to the UE via its own RRC entity.

The RRC in the small cell may perform the following functions for the UE with dual or multiple connections: sending small cell system information related Access Stratum (AS) to the UE, (re)establishment, maintenance and release of radio connections between the UE and the small cell, including allocating UE temporary identifier between UE and the small cell, configuration of signaling radio bearers for RRC connection, (re)establishment, configuration, maintenance and release of offloaded DRBs, QoS management for the DRBs, security functions including key management. The RRC in the macro-cell may perform the RRC functions in a normal eNB and functions for data offload, relay small cell RRC messages to the UE, and forward security key to the small cell eNB.

Figure 9:
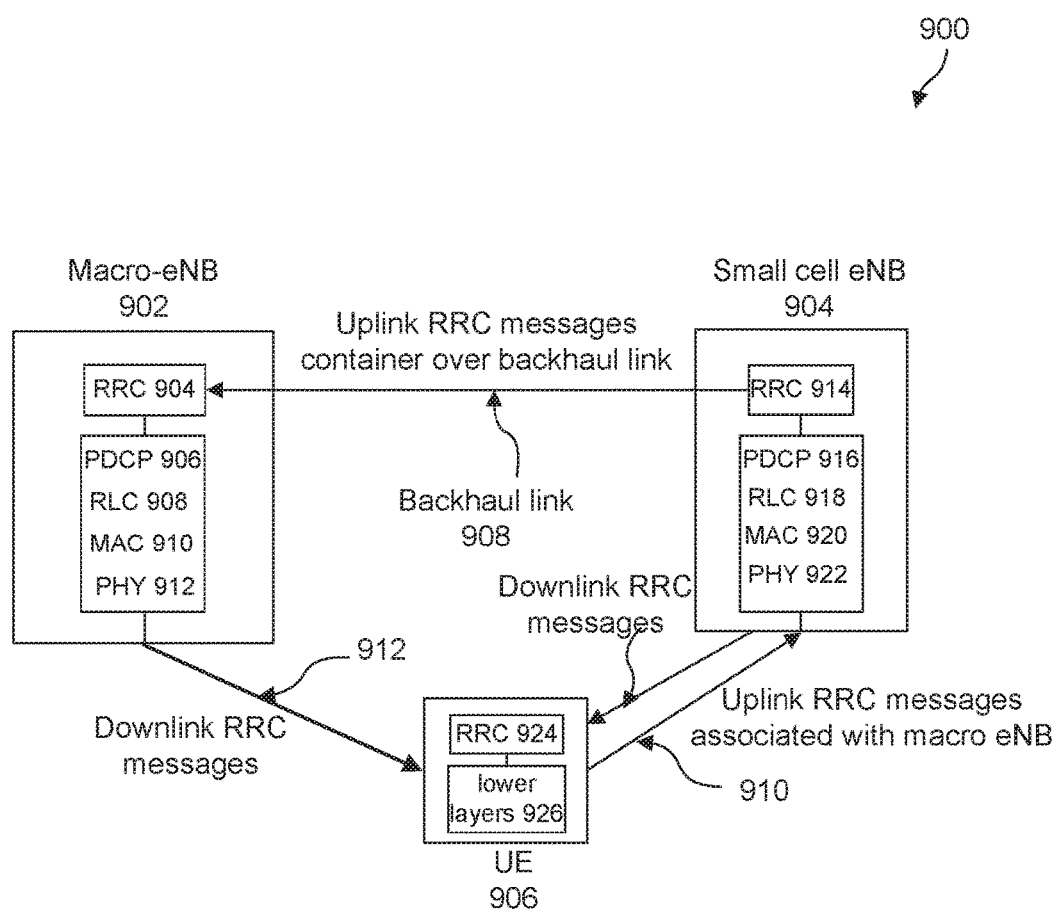
FIG. 9 illustrates a block diagram of yet another example method for radio resource control signaling in a wireless network with data offload, in accordance with an embodiment of the present disclosure.

FIG. 9 illustrates a block diagram 900 of another example method for radio resource control signaling in a wireless network with data offload. In this example method, RRC messages may be sent from either the macro-eNB or the small cell eNB to the UE. RRC messages (both uplink and downlink) between small cell and UE are delivered over a single predefined path: either directly between them or via the relay of macro-cell. For different RRC messages, the delivery path may be different. In some implementations, only certain types of RRC messages from small cell eNB are relayed via the macro-eNB, for example, the offload related RRC messages, measurement configuration, etc. Such downlink RRC messages originated from the small cell eNB may be transmitted to the UE 906 by the macro-eNB 902. In some implementations, the small cell eNB 904 may generate one or more types of downlink RRC messages and forward them to the macro-eNB 902 over the backhaul link, and the macro-eNB 902 may subsequently transmit the downlink RRC messages that are generated by the small cell eNB 904 to the UE 906. On the other hand, the radio bearer configuration/reconfiguration RRC messages specific to the small cell may be sent via the small cell eNB directly. In some implementations, a dedicated signaling connection may be established between the macro-eNB and small cell eNB, and then a dedicated signaling radio bearer, for example, SRB4, may be established for the small cell specific RRC messages. Thus, for the small-cell-specific RRC messages, the signaling connection is used directly for the signaling exchange. As illustrated in FIG. 9, the macro-eNB 902 includes a RRC layer 904, PDCP layer 906, RLC layer 908, MAC layer 910, and physical layer 912. The small cell eNB 904 includes a RRC layer 914, PDCP layer 916, RLC layer 918, MAC layer 920, and physical layer 922. The UE 906 includes a RRC layer 924 and lower layers 926. RRC messages (both uplink and downlink) between macro-eNB and UE are also delivered over a single predefined path: either directly between them or via the relay of small cell eNB.

As illustrated in FIG. 9, the UE 906 connects with both macro-eNB 902 and small cell eNB 904 for RRC messages. In other words, the UE 906 may communicate with the small cell eNB 904 and the macro-eNB 902 concurrently for different types of RRC messages.

For uplink, the uplink RRC messages generated by the UE 906 may be associated with the macro-eNB 902 or the small cell eNB 904. The UL message may also be delivered via a single predefined path, where the path selection depends on the RRC message type. For simpler physical transmission, it is easier for the UE to deliver UL RRC messages over a single wireless link. While it is possible to always deliver over the UL to macro-eNB, it is beneficial for the UE to transmit the uplink RRC messages to the small cell eNB because the path loss between the UE and the small cell eNB may be smaller than the path loss between the UE and the macro-eNB. The uplink RRC messages may include the RRC messages originated from the UE and targeting the macro-eNB. For the RRC messages targeted to the macro-eNB, the small cell eNB could simply relay those RRC messages to the macro-cell without reading the content inside. As shown in FIG. 9, the small cell eNB 904 may forward the uplink RRC messages received from the UE 906 to the macro-eNB 902 over the backhaul link 908.

It should be understood that although the small cell eNB shown in FIG. 9 includes a RRC layer and a PDCP layer, it is also possible that the small cell eNB does not contain a RRC layer or PDCP layer for the purpose of data offload. For example, the small cell eNB may only contain a RLC layer, MAC layer, and physical layer for data offload, and the received uplink RRC messages from the UE may be forwarded to the macro-eNB after the RLC layer processing.

Figure 10:
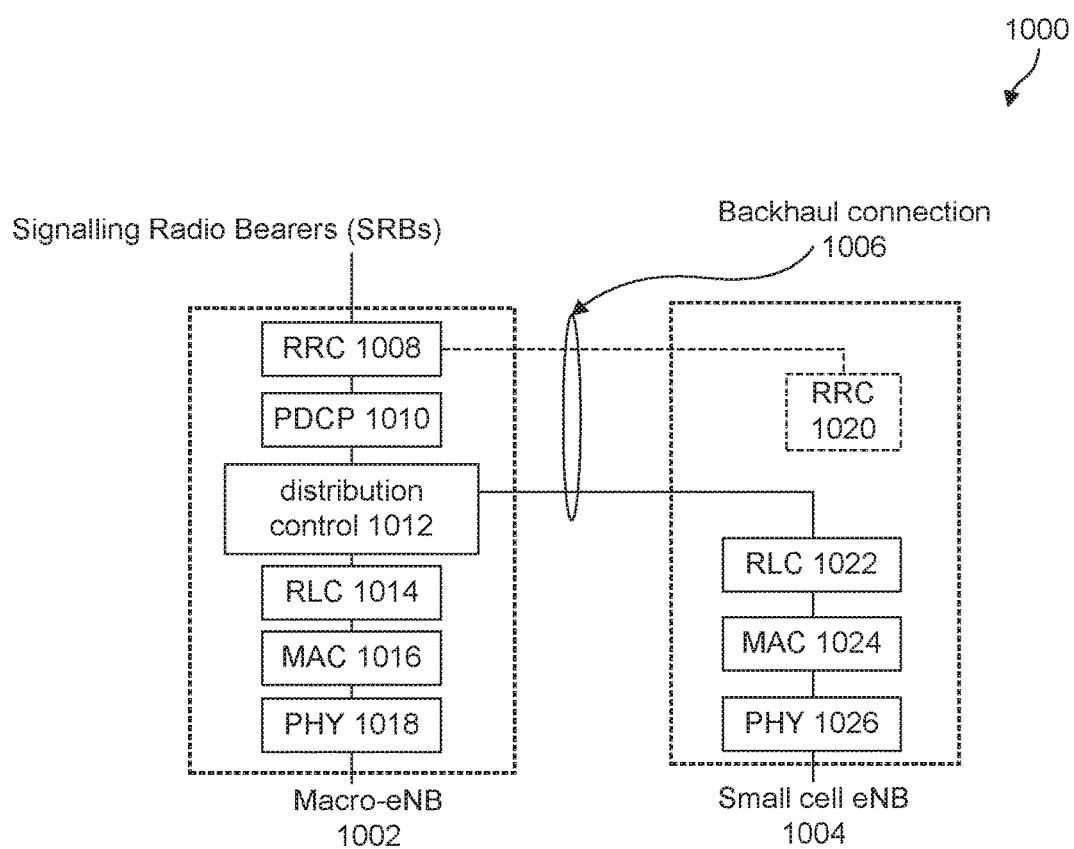
FIG. 10 illustrates a block diagram of yet another example method for radio resource control signaling in a wireless network with data offload, in accordance with an embodiment of the present disclosure.

FIG. 10 illustrates a block diagram 1000 of another example method for radio resource control signaling in a wireless network with data offload. In this example method, RRC messages may be sent from both the macro-eNB and the small cell eNB to the UE. RRC messages from the macro-eNB or the small cell eNB may be sent to a UE from both the small cell eNB and the macro-eNB for improved reliability. The transmission path may not be fixed, and may vary in time as a function of multiple factors including link quality and cell loading. For example, a UE specific RRC message of the macro-eNB may be sent to the UE from both the macro-eNB and the small cell eNB. For downlink, UE is configured to receive physical transmission from both macro-eNB and small cell eNB. In terms of physical transmission, what RRC messages are delivered from which wireless link is determined by multiple factors. For example, the network nodes can take into account the wireless channel condition to select the delivery path for a RRC message. In one example, a RRC message is delivered via the wireless link with better channel quality for selectivity gain, where the channel quality information is estimated by the network nodes or reported by the UE. In another example, the RRC message is delivered via both wireless links for diversity gain. Since this example method address lower layer physical link delivery, this example method can be combined with upper layer RRC routing for a variety of RRC message transmission. In one example, the small cell DL RRC messages (i.e., upper layer) can be routed to macro-cell, and the scheduler (i.e., lower layer) in macro-eNB may utilize radio resource of both wireless links for physical transmission to obtain diversity gain. In another example, the small cell DL RRC messages (i.e., upper layer) is passed to lower layers to be delivered by small cell directly, and the scheduler (i.e., lower layer) in small cell eNB may choose macro-cell wireless links for physical transmission considering the channel quality of two wireless links at the moment. Similar to downlink, variations of higher-layer, lower layer combinations can be used for UL RRC message delivery as well.

As illustrated in FIG. 10, the macro-eNB 1002 includes a RRC layer 1008, PDCP layer 1010, distribution control 1012, RLC layer 1014, MAC layer 1016, and physical layer 1018. The small cell eNB 1004 may include a RRC layer 1020, RLC layer 1022, MAC layer 1024, and physical layer 1026.

As shown in FIG. 10, RRC messages may be distributed from the macro-eNB 1002 to the small cell eNB 1004 after the PDCP layer over the backhaul connection 1006. The distribution control function in the macro-eNB determines which RRC messages will be sent over the small cell. The decision can be based the type of RRC message. For example, the RRC messages for paging may always be sent over the macro-eNB while the RRC messages for handover command may be sent to the UE via both the macro-cell and the small cell for increased reliability of delivery. For some other RRC messages which require UE responses, such as measurements, they may be sent by the small cell eNB, and the corresponding UE response will be sent to the small cell eNB. The UE should monitor both the link with the macro-eNB and the link with the small cell eNB for the RRC messages.

Figure 11:
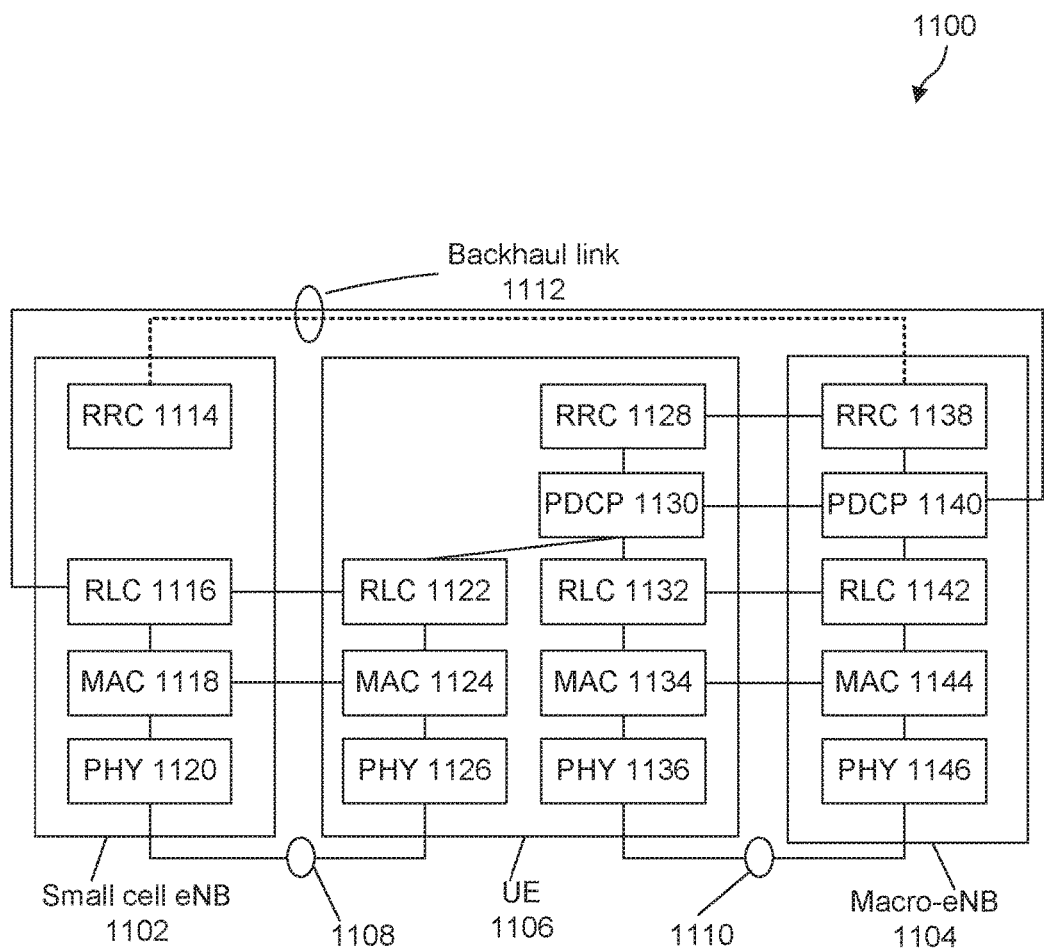
FIG. 11 illustrates another example protocol layer implementation of a UE in a wireless network with data offload, in accordance with an embodiment of the present disclosure.

FIG. 11 illustrates another example protocol layer implementation 1100 of a UE in a wireless network with data offload. The UE 1106 maintains a single RRC entity. The macro-eNB 1104 and the small cell eNB 1102 may maintain a backhaul link 1112 to exchange the RRC messages. The UE 1106 maintains dual connection with both the small cell eNB 1102 and the macro-eNB 1104. As shown in FIG. 11, the UE communicates with the small cell eNB via the radio link 1108, and communicates with the macro-eNB via the radio link 1110. As illustrated in FIG. 11, the small cell eNB 1102 includes a RRC layer 1114, RLC layer 1116, MAC layer 1118, and physical layer 1120. The macro-eNB 1104 includes a RRC layer 1138, PDCP layer 1140, RLC layer 1142, MAC layer 1144, and physical layer 1146. The UE 1106 may include a RLC layer 1122, MAC layer 1124, and physical layer 1126 for the small cell eNB 1102, and include a RRC layer 1128, PDCP layer 1130, RLC layer 1132, MAC layer 1134, and physical layer 1136 for the macro-eNB 1104.

Figure 12:
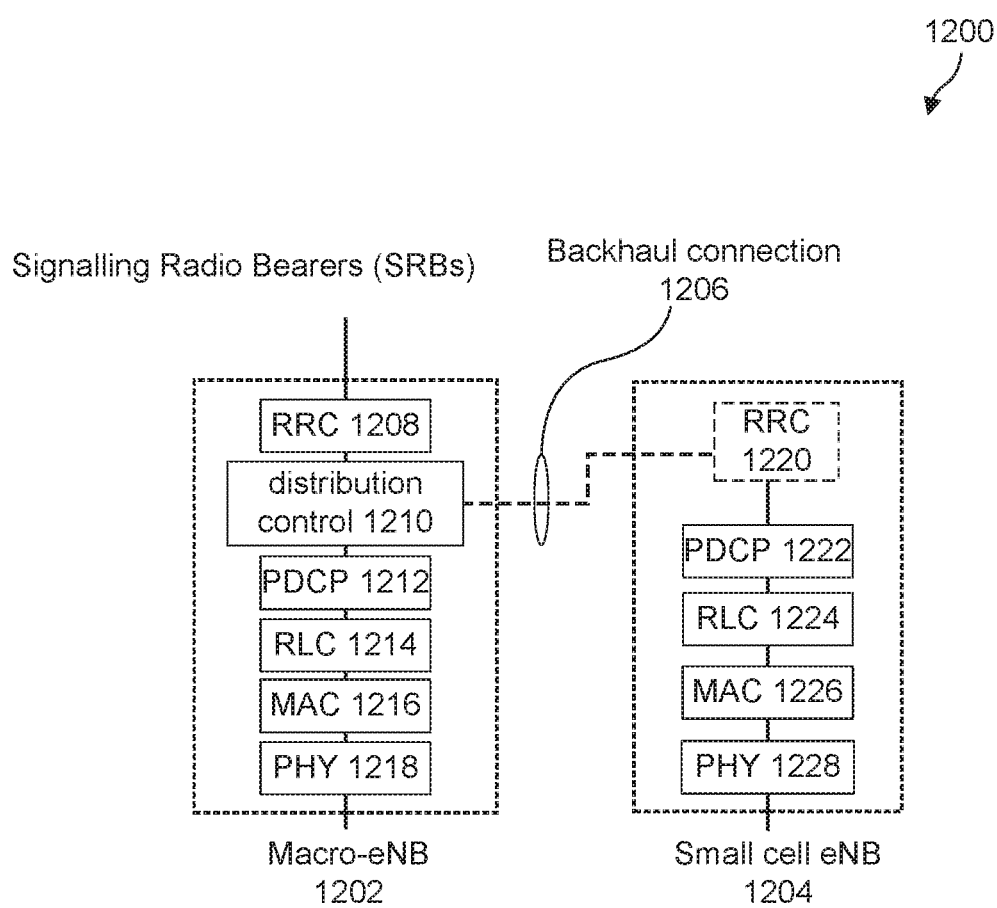
FIG. 12 illustrates a block diagram of yet another example method for radio resource control signaling in a wireless network with data offload, in accordance with an embodiment of the present disclosure.

FIG. 12 illustrates a block diagram 1200 of another example method for radio resource control signaling in a wireless network with data offload. As shown in FIG. 12, the RRC messages are split before the PDCP layer, and are exchanged between the macro-eNB 1202 and the small cell eNB 1204 over the backhaul connection 1206. Two independent signaling radio bearers may be established between the macro-eNB 1202 and the UE, and between the small cell eNB 1204 and the UE. Each RRC message may have a unique identifier. If the UE receives a message from one cell, and later the UE receives a message with the same identifier from another cell, the message should be discarded without further action. In some implementations, some RRC messages may be pre-configured to be transmitted from the macro-eNB while other messages are pre-configured to be transmitted from the small cell eNB.

As illustrated in FIG. 12, the macro-eNB 1202 includes a RRC layer 1208, distribution control 1210, PDCP layer 1212, RLC layer 1214, MAC layer 1216, and physical layer 1218. The small cell eNB 1204 may include a RRC layer 1220, PDCP layer 1222, RLC layer 1224, MAC layer 1226, and physical layer 1228.

To avoid the duplication and signaling overhead, in some implementations, not all RRC messages may need to be transmitted from both macro-eNB and the small cell eNB. In some implementations, only mobility RRC messages are transmitted. For the uplink RRC messages, both the macro-eNB and small cell eNB could try to receive the messages, and deliver to the corresponding RRC entities. In some implementations, the UE could select either the small cell eNB or macro-eNB to transmit the RRC messages based on the message type and the radio conditions. One approach to determine which wireless link a small cell RRC message is delivered over is to divide the messages according to SRB type. For example, SRB0 for RRC messages using the common control channel (CCCH) logical channel may be transmitted by the macro-eNB. The SRB0 carries, for example, the following RRC messages: RRCConnectionSetup, RRCConnectionRequest, RRCConnectionReject, RRCConnectionReestablishment, RRCConnectionReestablishmentRequest, RRCConnectionReestablishmentReject.

Figure 13:
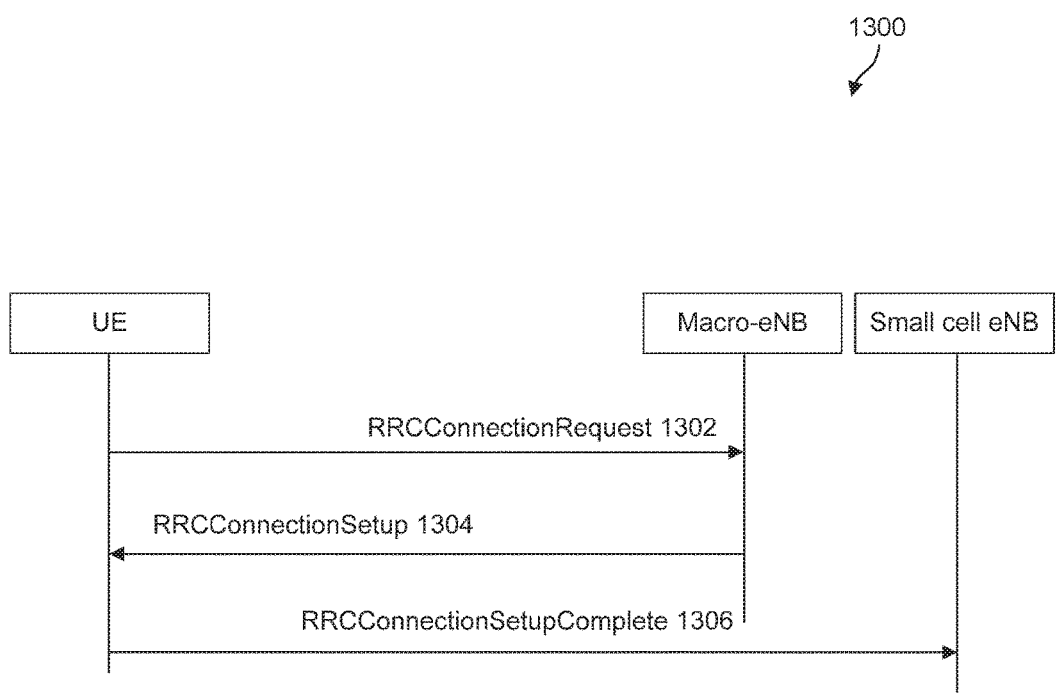
FIG. 13 illustrates an example signaling diagram for data offload in a wireless network, in accordance with an embodiment of the present disclosure.

FIG. 13 illustrates an example signaling diagram 1300 for data offload in a wireless network. At 1302, the UE may send a RRCConnectionRequest message to the macro-eNB to request the establishment of an RRC connection with a small cell. The small cell physical ID may be added in the RRCConnectionRequest message. An example RRCConnectionRequest message is illustrated in Table 1.

TABLE 1

| An example RRCConnectionRequest message | | |
|---|---|---|
| InitialUE-Identity ::= | CHOICE { | |
| s-TMSI | | S-TMSI, |
| randomValue | | BIT STRING (SIZE (40)) |
| physCellId smallCell, } | | PhysCellId- |

At 1304, the macro-eNB may send a RRCConnectionSetup message over SRB0 to the UE from to establish SRB1 for small cell. The physical layer ID of the small cell eNB may be added to the RRCConnectionSetup message. An example RRCConnectionSetup message is illustrated in Table 2.

TABLE 2

An example RRCConnectionSetup message

```
RRCConnectionSetup ::=              SEQUENCE {
    physCellId                          PhysCellId-smallCell,
    rrc-TransactionIdentifier           RRC-TransactionIdentifier,
    criticalExtensions                  CHOICE {
        c1                                  CHOICE {
            rrcConnectionSetup-r8               RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture            SEQUENCE { }
    }
}
```

At 1306, the UE may send the corresponding RRCConnectionSetupComplete message over SRB1 to the designated small cell to confirm the RRC connection establishment.

Figure 14:
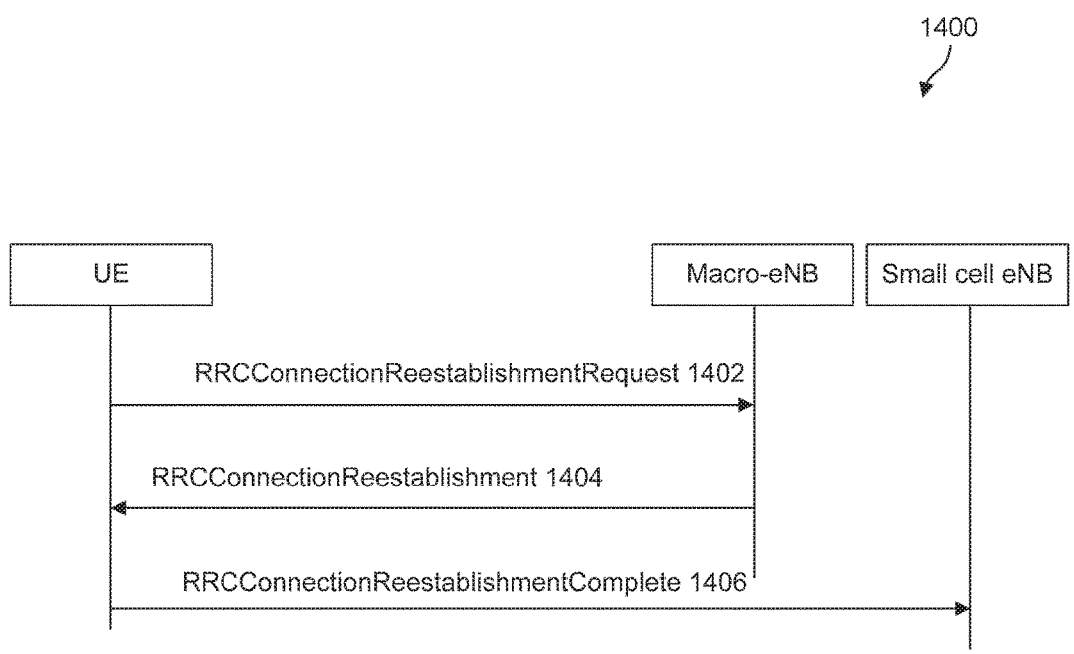
FIG. 14 illustrates another example signaling diagram for data offload in a wireless network, in accordance with an embodiment of the present disclosure.

FIG. 14 illustrates another example signaling diagram 1400 for data offload in a wireless network. At 1402, the UE may send a RRCConnectionReestablishmentRequest message to the macro-eNB to resume the SRB1 operation from small cell. The small cell physical ID may be added in the RRCConnectionReestablishmentRequest message to indicate that the UE is requesting the reestablishment of an RRC connection to the small cell. The reestablishment may occur after a handover failure. An example RRCConnectionReestablishmentRequest message is illustrated in Table 3.

TABLE 3

An example RRCConnectionReestablishmentRequest message

```
ReestabUE-Identity ::=              SEQUENCE {
    c-RNTI                              C-RNTI,
    physCellId                          PhysCellId-smallCell,
    shortMAC-I                          ShortMAC-I
}
```

At 1404, the macro-eNB may send a RRCConnectionReestablishment message to the UE to re-establish the RRC connection with the small cell eNB. At 1406, the UE may send the corresponding RRCConnectionReestablishmentComplete message to the designated small cell over SRB1 to confirm the successful completion of the RRC connection re-establishment.

The systems and methods described above may be implemented by any hardware, software or a combination of hardware and software having the above described functions. The software code, either in its entirety or a part thereof, may be stored in a computer readable memory.

The example protocol layer implementation of FIGS. 5, 7, 8, and 11 may be implemented using coded instructions (e.g., computer-readable instructions) stored on a tangible computer-readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer-readable storage and to exclude propagating signals. Additionally or alternatively, the example processes of 500, 700, and 900 may be implemented using coded instructions (e.g., computer-readable instructions) stored on a non-transitory computer-readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals. Also, in the context of the current invention disclosure, as used herein, the terms "computer readable" and "machine readable" are considered technically equivalent unless indicated otherwise.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method, comprising:
receiving, at a user equipment (UE), a radio resource control (RRC) message from a first base station while the UE communicates concurrently with the first base station and a second base station, and the RRC message received from the first base station includes a label that identifies the second base station.

2. The method of claim 1, wherein the RRC message is transmitted from the second base station to the first base station.

3. The method of claim 1, wherein the RRC message is encrypted by the first base station.

4. The method of claim 1, wherein the RRC message is received from the first base station on a dedicated signal radio bearer (SRB) that identifies the second base station.

5. The method of claim 1, wherein each of the first base station and the second base station performs a different subset of RRC functionalities for the UE.

6. The method of claim 1, wherein the first base station is a macro node, and the second base station is a low power node.

7. The method of claim 1, wherein the second base station receives user plane data from the UE.

8. A user equipment (UE), comprising:
a memory; and
at least one hardware processor communicatively coupled with the memory and configured to: receive a radio resource control (RRC) message from a first base station while the UE communicates concurrently with the first base station and a second base station, and the RRC message received from the first base station includes a label that identifies the second base station.

9. The user equipment of claim 8, wherein the RRC message is transmitted from the second base station to the first base station.

10. The user equipment of claim 8, wherein the RRC message is encrypted by the first base station.

11. The user equipment of claim 8, wherein the RRC message is received from the first base station on a dedicated signal radio bearer (SRB) that identifies the second base station.

12. The user equipment of claim 8, wherein each of the first base station and the second base station performs a different subset of RRC functionalities for the UE.

13. The user equipment of claim 8, wherein the first base station is a macro node, and the second base station is a low power node.

14. The user equipment of claim 8, wherein the second base station receives user plane data from the UE.

15. A non-transitory computer-readable medium storing instructions which, when executed, cause a computing device to perform operations comprising, comprising:
receiving, at a user equipment (UE), a radio resource control (RRC) message from a first base station while the UE communicates concurrently with the first base station and a second base station, and the RRC message received from the first base station includes a label that identifies the second base station.

16. The non-transitory computer-readable medium of claim 15, wherein the RRC message is transmitted from the second base station to the first base station.

17. The non-transitory computer-readable medium of claim 15, wherein the RRC message is encrypted by the first base station.

18. The non-transitory computer-readable medium of claim 15, wherein the RRC message is received from the first base station on a dedicated signal radio bearer (SRB) that identifies the second base station.

19. The non-transitory computer-readable medium of claim 15, wherein each of the first base station and the second base station performs a different subset of RRC functionalities for the UE.

20. The non-transitory computer-readable medium of claim 15, wherein the first base station is a macro node, and the second base station is a low power node.

* * * * *

UNITED STATES PATENT AND TRADEMARK OFFICE
CERTIFICATE OF CORRECTION

PATENT NO. : 10,321,511 B2
APPLICATION NO. : 15/967228
DATED : June 11, 2019
INVENTOR(S) : Shiwei Gao, Yufei Wu Blankenship and Zhijun Cai Page 1 of 1

It is certified that error appears in the above-identified patent and that said Letters Patent is hereby corrected as shown below:

In the Claims

Column 18, Line 19, In Claim 15, after "operations" delete "comprising,".

Signed and Sealed this
Twelfth Day of November, 2019

Andrei Iancu
*Director of the United States Patent and Trademark Office*